No. 666,927. Patented Jan. 29, 1901.
R. B. FINCH.
EYEGLASSES.
(Application filed Apr. 18, 1900.)
(No Model.)
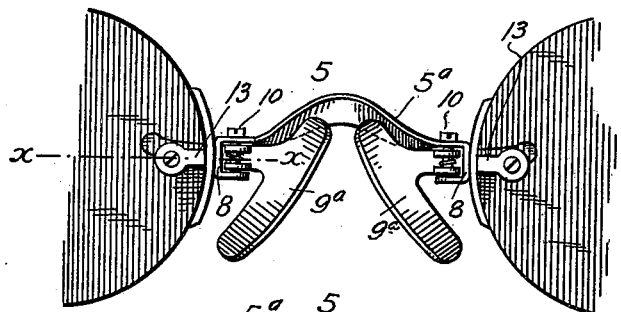
FIG. 1
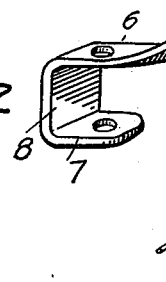
FIG. 2
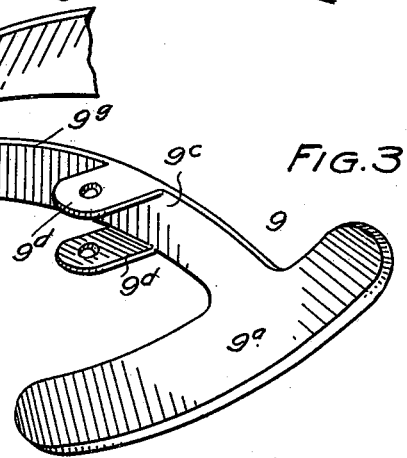
FIG. 3
FIG. 4
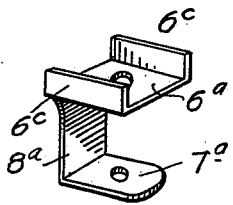
FIG. 5
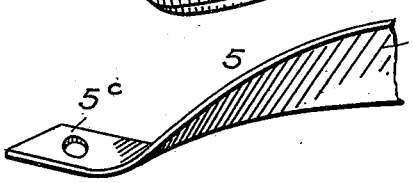
FIG. 6
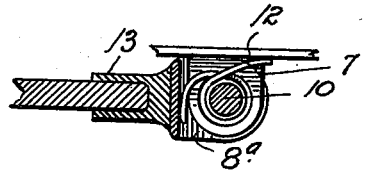
FIG. 7
WITNESSES:
INVENTOR.
Robert Brooks Finch
BY
ATTORNEY
THE NORRIS PETERS CO., PHOTO-LITHO., WASHINGTON, D. C.

UNITED STATES PATENT OFFICE.

ROBERT BROOKS FINCH, OF DENVER, COLORADO, ASSIGNOR OF ONE-HALF TO EDWIN T. JONES, OF SAME PLACE.

EYEGLASSES.

SPECIFICATION forming part of Letters Patent No. 666,927, dated January 29, 1901.

Application filed April 18, 1900. Serial No. 13,403. (No model.)

*To all whom it may concern:*

Be it known that I, ROBERT BROOKS FINCH, a citizen of the United States of America, residing at Denver, in the county of Arapahoe and State of Colorado, have invented certain new and useful Improvements in Eyeglasses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in eyeglasses of the class having a rigid bridge as distinguished from those having a yielding or spring bridge. The advantages of the rigid bridge are well understood, since it prevents the axes of the lenses from moving out of their proper position when adjusted to fit the eye.

The main feature of an invention of this class consists in the fact that the pressure of the nosepieces of the guards is applied to the nose independently of any motion, either of the connecting-bridge or the lenses, thereby permitting the use of any form or shape of bridge desired and at the same time preserving absolute rigidity.

The invention will now be described in detail, reference being made to the accompanying drawings, in which is illustrated an embodiment thereof.

In the drawings, Figure 1 is a back view of my improved eyeglasses shown on an enlarged scale. Fig. 2 is a fragmentary perspective view of the bridge shown on an enlarged scale and provided with a guard-keeper formed integral with its outer extremity. Fig. 3 is a perspective view of my improved guard very much enlarged. Fig. 4 is a detail view of the screw-pin for connecting the guard with the keeper at the extremity of the bridge. Figs. 5 and 6 illustrate in perspective the detachable form of keeper and bridge. Fig. 7 is a horizontal section taken on the line X X, Fig. 1, the parts being shown on a larger scale.

Similar reference characters indicate corresponding parts in the views.

Referring first to the form of construction shown in Figs. 1 and 2, let the numeral 5 designate the bridge of the eyeglasses. This bridge is formed rigid and provided at each extremity with a keeper composed of upper and lower apertured parallel arms or lugs 6 and 7, connected by a vertical part 8. The flat surface of the body portion of the bridge occupies a position at an angle to the plane of the keeper-arms, whereby when the eyeglasses are worn the bridge rests upon and fits the bridge of the nose.

The guard 9 is composed of a nosepiece $9^a$ and a lever $9^c$. The parts $9^a$ and $9^c$ are preferably formed integral with each other, being stamped or otherwise formed from a single piece of material. The lever is provided with two apertured lugs or projections $9^d$, adapted to pass between the keeper-arms 6 and 7. The guard is connected with a keeper by passing a screw-pin 10 through the registering openings of the lever-lugs and the keeper-arms. A coil-spring 12 surrounds the screw-pin between the lugs $9^d$. One extremity of this spring bears against the lever, while the other extremity engages the part 8 of the keeper. The tendency of this spring is to cause the nosepieces to press the nose sufficiently to hold the eyeglasses in position.

As shown in the drawings, the lenses are rimless, and the bracket 13, which engages the lenses, is soldered or otherwise fastened to the keeper.

My improvement may be employed with either frame or rimless eyeglasses.

As shown in Figs. 5 and 6, the keeper and bridge are formed separate and are connected by the screw-pin. By reason of this construction bridges of different length may be employed without otherwise changing the mounting. This is important, since all people cannot use bridges of the same length. The parts of the detachable keeper are designated by the reference characters $6^a$, $7^a$, and $8^a$ in the drawings. The extremity $5^c$ of the detachable bridge is apertured to receive the screw-pin and fits between vertical flanges $6^c$, formed on the arm $6^a$. The guard for this style of keeper is the same as that already described.

The keeper whether formed integral with the bridge or detachable therefrom forms a bearing for the pin both above and below the guard-lever, whereby the screw is held securely in place and forms a firm fulcrum for the lever, whose lugs are embraced above and below by the keeper-arms.

In using my improved construction the nosepieces may be separated or opened by pressing inwardly on the forwardly-projecting arms 9ᵍ of the levers.

Having thus described my invention, what I claim is—

1. In eyeglasses, the combination of a rigid bridge provided at each extremity with a keeper having two separated arms, and a guard provided with a lever having separated lugs adapted to pass between the arms of the keeper, the keeper-arms and the lugs of the lever being provided with coinciding apertures, a fulcrum-pin passing through said apertures, and a spring surrounding said pin between the lugs of the lever and having a tendency to cause the nosepieces of the guard to grasp the nose of the wearer.

2. In eyeglasses, the combination with a rigid bridge having flattened apertured extremities, a keeper consisting of upper and lower apertured arms and a connecting part, the upper arm having vertical flanges between which the bridge extremity fits, a guard having a lever-arm provided with apertured lugs adapted to fit between the keeper-arms, a pin passing through the openings in the bridge extremity, the keeper-arms and the lever-lugs, and a spring surrounding said pin, one extremity of the spring bearing against the keeper and the other against the lever.

In testimony whereof I affix my signature in presence of two witnesses.

ROBERT BROOKS FINCH.

Witnesses:
  A. J. O'BRIEN,
  GRACE MYTINGER.